United States Patent [19]
Kelly et al.

[11] 3,881,004
[45] Apr. 29, 1975

[54] AMMONIUM NITRATE PLANT

[75] Inventors: Harold D. Kelly, Marseilles; Charles F. Block, Ottawa, both of Ill.; Thomas L. McDonald, Richmond Heights, Ohio

[73] Assignee: Masar, Incorporated, Richmond Heights, Ohio

[22] Filed: Dec. 29, 1972

[21] Appl. No.: 319,864

[52] U.S. Cl. .............................. 423/235; 423/392
[51] Int. Cl. ............................................ B01d 53/34
[58] Field of Search ................. 423/392, 396, 235

[56] References Cited
UNITED STATES PATENTS

| | | | |
|---|---|---|---|
| 2,102,136 | 12/1937 | Shapleigh | 423/396 |
| 3,144,321 | 8/1964 | Butikofer | 423/396 |
| 3,441,380 | 4/1969 | Morrow | 423/392 |
| 3,453,071 | 7/1969 | Schmitt et al. | 423/235 |
| 3,565,575 | 2/1971 | Warshaw | 423/235 |
| 3,579,298 | 8/1968 | O'Brien et al. | 423/396 |

FOREIGN PATENTS OR APPLICATIONS

| | | | |
|---|---|---|---|
| 1,090,154 | 11/1967 | United Kingdom | 423/235 |
| 1,076,097 | 2/1960 | Germany | 423/235 |

Primary Examiner—G. O. Peters

[57] ABSTRACT

An ammonium nitrate fertilizer plant is provided with an ammonia converter for producing oxides of nitrogen, a waste heat boiler and a condenser for cooling the gases, a multi-stage countercurrent absorption tower for recovering nitric acid, and a neutralizer reacting the nitric acid with ammonia to produce ammonium nitrate, and is characterized by an ammonia-cooled refrigerator-absorber preheating such ammonia while simultaneously refrigerating the tail gas from the absorption tower, said refrigerator-absorber receiving all or part of the feedwater for the absorption tower and having tubes for cooling such water and for effecting removal of nitrogen dioxide from the tail gas, and a multi-stage low-temperature abatement tower receiving the refrigerated tail gas, water and nitric acid from said refrigerator-absorber and having means for continuously recirculating a weak acid solution through the packing bed of the first scrubber stage to recover nitric acid for return with the refrigerated feedwater to the absorption tower and having means for continuously recirculating a refrigerated "Masar" solution of water, ammonium nitrate, urea and nitric acid through the packing beds of the subsequent scrubber stages, whereby nitrogen oxides are effectively removed with a relatively low pressure drop in the abatement tower and a relatively small consumption of the Masar solution and additional amounts of ammonium nitrate are recovered. The invention provides economical absorption of the nitrogen oxides and reduces $NO_x$ emissions to acceptable levels in a simple, reliable and efficient manner with a minimum investment in new equipment and is, therefore, ideal for use on existing plants.

26 Claims, 7 Drawing Figures

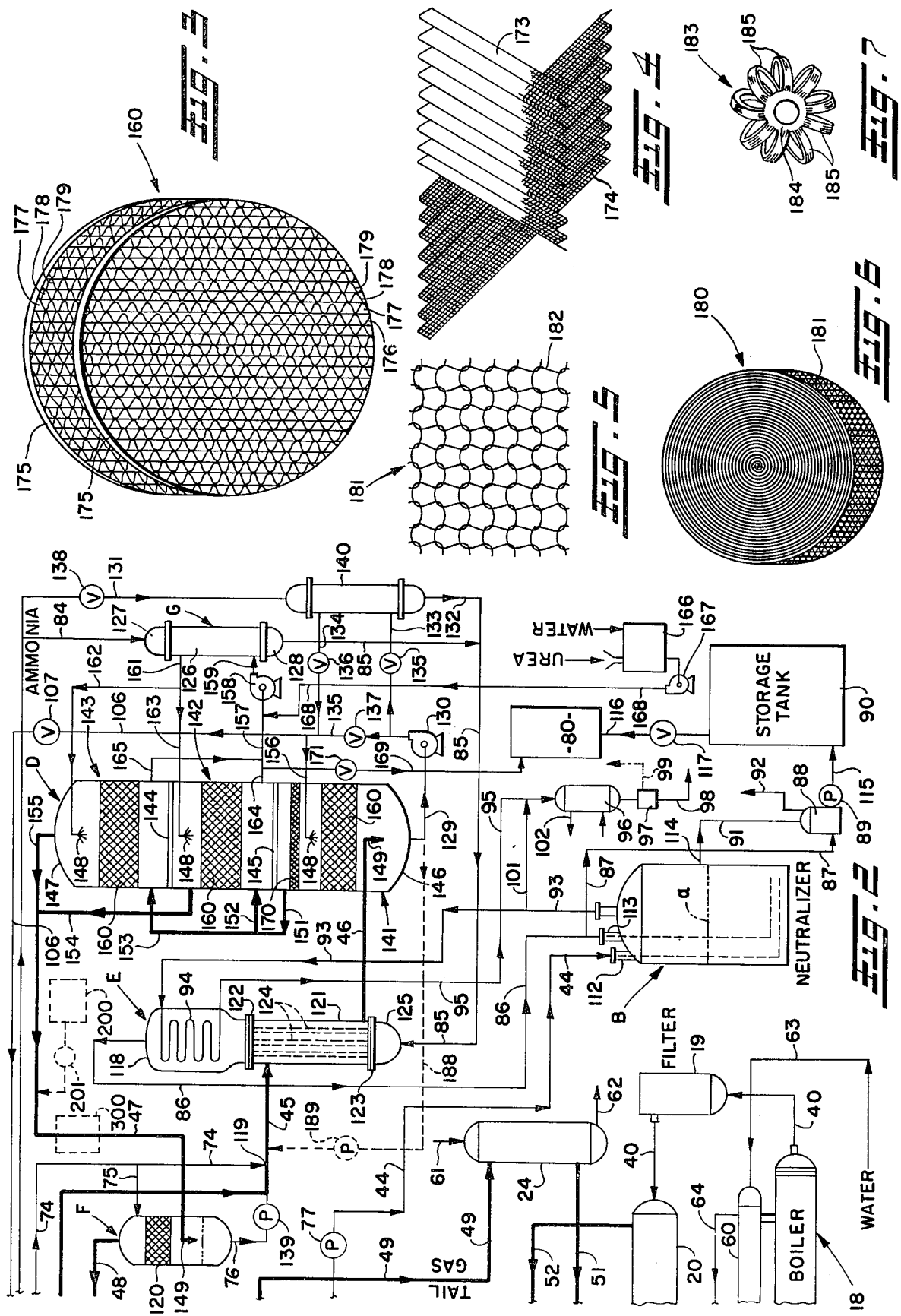

AMMONIUM NITRATE PLANT

The present invention relates to a process and apparatus for improving the performance of an ammonium nitrate plant, and more particularly to an ammonium nitrate plant which can be made and operated economically with acceptable emissions of nitrogen oxides.

BACKGROUND OF THE INVENTION

In a commercial nitric acid plant, ammonia is reacted with air over a catalyst to produce nitrogen oxide, which is partially oxidized by the oxygen remaining in the gas stream to produce nitrogen dioxide. The latter is then absorbed in water to yield nitric acid which is collected at the bottom of the absorption tower. In a typical tower the gas moves upwardly through 30 or more absorption stages, and its nitrogen oxides content is reduced to less than one-half percent by volume by the time it reaches the upper stages.

In each absorption stage the removal of such oxides requires oxidation of nitric oxide to nitrogen dioxide and sufficient gas-liquid contact to absorb the dioxide in water. Unfortunately the reaction of nitrogen dioxide with water converts only part of the dioxide to nitric acid and reconverts the remainder to nitric oxide, which must be reoxidized. Removal of the nitrogen oxides becomes more difficult in each succeeding stage as the concentration thereof is reduced because more time is needed to carry out the reoxidation of the nitric oxide and it is more difficult to achieve the gas-liquid contact needed to absorb the nitrogen dioxide. For example, the time required to oxidize half of the NO to $NO_2$ in a volume of air increases from about 1 minute to about 10 minutes when the NO concentration is reduced from 3500 to 350 parts per million. Also, when the concentration of $NO_2$ is below 300 parts per million, the absorption rate is so low that unduly long retention time is required to reduce the concentration. Because of these and other factors and the need to maintain high flow rates, the cost of improved absorption in a nitric acid plant rises exponentially and soon becomes prohibitive when it is attempted to reduce the nitrogen oxides content at the top of the absorption tower to a low level, substantially below 0.1 percent by volume, for example.

It is known that such low levels can be achieved in many different ways as, for example, by increasing the amount of high-pressure bleach air supplied from the compressor to the tower, decreasing the temperature or increasing the pressure in the tower, increasing the size of the tower or the number of stages therein, etc., but such measures are expensive and inefficient and are clearly impractical as a means for meeting state or federal pollution standards. Because of cost and efficiency considerations, most nitric acid plants are designed so that the tail gas leaving the absorption tower on the average contains probably about 0.2 to 0.35 percent by volume of nitrogen oxides. Such tail gas can be treated in a conventional catalytic combustion system to reduce the $NO_x$ content below 0.04 percent (400 ppm) or sufficient to meet present federal standards, but this will increase production costs greatly.

Up to the time of the present invention, the catalytic combustion system was considered the only commercially practical abatement system for nitric acid plants and was apparently the only system actually installed on such plants, although it required large capital investment. Except perhaps for proposed molecular sieve systems, no other system has found commercial acceptance. Many other techiques have been investigated for decomposing, reducing or adsorbing the nitrogen oxides but no practical solution to the problem was found prior to the present invention. Proposed abatement systems are disclosed in U.S. Pat. Nos. 1,029,528; 2,910,343; 2,970,034; 3,008,796; 3,012,851; 3,004,844; 3,382,033; 3,425,803; 3,328,797 and 3,565,575. Ammonia, hydrogen sulfide and hydrogen, for example, have been considered as means for reducing the nitrogen oxides, but each of these systems have problems which interfere with commercial use on nitric acid plants.

Scrubbing of the tail gas with acid or alkaline solutions or various chemicals, including magnesium hydroxide, ammonia, urea, potassium permanganate, sulfuric acid, limewater, sodium dichromate, etc., has also been considered. However, because of the very low concentration of nitrogen oxides in the tail gas and the large volumes of gases emitted from the nitric acid plants, it is extremely difficult to achieve the desired effect in an economical way, and none of such scrubbing systems have been commercially feasible for nitric acid plants. The cost of chemical treatment was also excessive because of the large amounts of chemicals needed to treat the large volumes of tail gas emitted from a nitric acid plant and other factors, such as excessive gas retention times. For example, it is known that the amount of nitrogen dioxide in a gas can be reduced by scrubbing in an aqueous area solution as disclosed in U.S. Pat. Nos. 3,528,797 and 3,565,575 and in U.S.S.R. Pat. No. 186,985, but this was not considered commercially practical for treating large volumes of tail gas, as is conceded in the latter patent, and does not solve the problem of oxidizing low concentrations of nitric oxide. The previously known scrubbing systems based on urea or other chemicals were not commercially feasible and could not compete with the standard catalytic combustion systems.

The problem, which has faced the nitric acid industry for so many years, is to increase the recovery of nitric acid and/or ammonium nitrate and to minimize the discharge to atmosphere of nitrogen oxides without destroying plant efficiency or requiring use of unduly expensive equipment. Because of the stringent requirements, the catalytic combustor system was the only practical answer to this problem prior to this invention. The problem of updating existing plant to reduce the $NO_x$ emissions to acceptable levels was particularly serious because of the need to retain existing equipment, which was designed to operate efficiently under certain conditions and could not easily be altered. For example, a small change in the pressure drop through the existing equipment could drastically change the power requirements and drastically reduce the efficiency. In spite of its high cost, the catalytic combustion system seemed to be the only practical solution to the problem of updating the existing plants, except perhaps for the proposed molecular sieve system. Scrubbing of the tail gas with water or chemicals by the previously known methods did not solve the problem, and the nitric acid industry was convinced that such scrubbing methods could not reduce the nitrogen oxides content to desired low levels such as 300 parts per million or less and would merely change the problem from one of air pollution to one of water pollution.

The present invention provides a practical solution to the problem of improving both new and existing plants which is simple but revolutionary because it is efficient and relatively inexpensive to build and because it substantially offsets the increased cost of $NO_x$ abatement by greater recovery of nitric acid and ammonium nitrate. The process of this invention is not only cheaper than the catalytic combustion process but also more reliable, because it does not relay on an expensive unpredictable catalyst, and more suitable for use in locations which do not have a ready supply of natural gas or other suitable fuel. It presently appears to be far superior to the catalytic combustion system as a means for modifying existing plants to reduce the $NO_x$ emissions below 350 parts per million by volume, for example, because of simplicity, low installation cost, ease of operation reliability and low operating cost. It is also more suitable for use on plants which tail gas having a relatively high oxygen content, such as 5 percent or higher by volume.

SUMMARY OF THE INVENTION

An ammonium nitrate plant constructed according to the present invention includes the conventional elements of a nitric acid plant, including the ammonia converter and multi-stage absorption tower, plus a unique multi-stage low-temperature abatement unit having means for recirculating a refrigerated weak nitric acid solution though the packing bed or one or two scrubbing stages, means for recovering nitric acid from those stages for return with the refrigerated feedwater to the absorption tower, means for recirculating a refrigerated "Masar" treating solution through the packing beds of one or more subsequent stages of said abatement unit, and means for recovering ammonium nitrate from the latter stages in concentrated form. Heat is transferred from the recirculating liquid to the ammonia, which is being fed from the storage tank to the neutralizer, by refrigeration means which maintains the packing beds of the abatement unit at very low temperatures, such as 0° to 5°C.

As the large volume of tail gas moves from the absorption tower, its nitrogen oxides content is reduced to a much lower level by passing it through a unique ammonia-cooled refrigerator-absorber unit which cools the tail gas to a very low temperature, such as 0° to 5°C., while simultaneously removing major amounts of nitrogen dioxide and recovering valuable nitric acid.

In spite of the large volumes of tail gas, such refrigerator-absorber unit functions effectively as a first-stage abator and discharges the refrigerated tail gas to the multi-stage abatement tower at a significantly lower nitrogen oxides content. Such refrigerator-absorber unit used in conjunction with such abatement tower provides a surprisingly effective combination for $NO_x$ abatement in existing high-pressure high-capacity nitric acid plants, and the relatively low pressure drop achieved when using special packing materials in the abatement tower to handle the large gas volumes makes it possible to achieve such abatement without unduly reducing the efficiency of the existing equipment. The combination achieves effective removal of the nitrogen monoxide at surprisingly low cost and makes it possible to remove the nitrogen dioxide with relatively low consumption of urea using a chemical treatment system which is simple and easily regulated. The overall cost of operation of a plant modified in this manner is much less than that of a plant modified in this manner is much less than that of a plant using the conventional catalytic combustor system, particularly because of the continual recovery of large amounts of ammonium nitrate and nitric acid from the abatement tower.

An object of the present invention is to increase the efficiency of a ammonium nitrate plant or nitric acid plant and to remove more of the nitrogen oxides from the gases before they are discharged from the plant.

Another object of the invention is to provide a commercially practical system for increasing the efficiency and/or effectiveness of existing ammonium nitrate or nitric acid plants in removing nitrogen oxides which does not require excessive investment in new equipment.

A still further object of the invention is to increase the recovery of nitric acid in an existing nitric acid plant without unduly increasing the cost of operation of the plant.

Another object of the invention is to provide a commercially practical system for reducing the emission of nitrogen oxides from nitric acid plants to environmentally acceptable levels without combustion of natural gas or other fuel.

Another object of the invention is to provide an abatement system for existing nitric acid plants which does not drastically increase power requirements or seriously reduce the efficiency of the plant.

Another object of the invention is to provide a gas scrubbing system for nitric acid plant which can effectively and efficiently reduce the nitrogen oxides content of large volumes of tail gas from more than 2000 to less than 300 parts per million by volume without unduly large or unduly expensive equipment.

Another object of the invention is to provide an abatement system for nitric acid plants which is more predictable and more reliable than the catalytic combustion system.

These and other objects, uses and advantages of the invention will become apparent to those skilled in the art from the following drawings, description and claims.

In the drawings:

FIGS. 1 and 2 are a diagrammatic view showing on a reduced scale an ammonium nitrate plant constructed according to the present invention;

FIG. 3 is a perspective view on a reduced scale showing a corrugated metal packing used in the abatement tower;

FIG. 4 is a perspective view illustrating the cross arrangement of the corrugations in a corrugated packing;

FIG. 5 is a fragmentary top plan view showing a knitted wire mesh packing material;

FIG. 6 is a perspective view of a spirally-wound packing bed formed from wire mesh; and FIG. 7 is a perspective view showing an alternative packing material.

Figure 1:
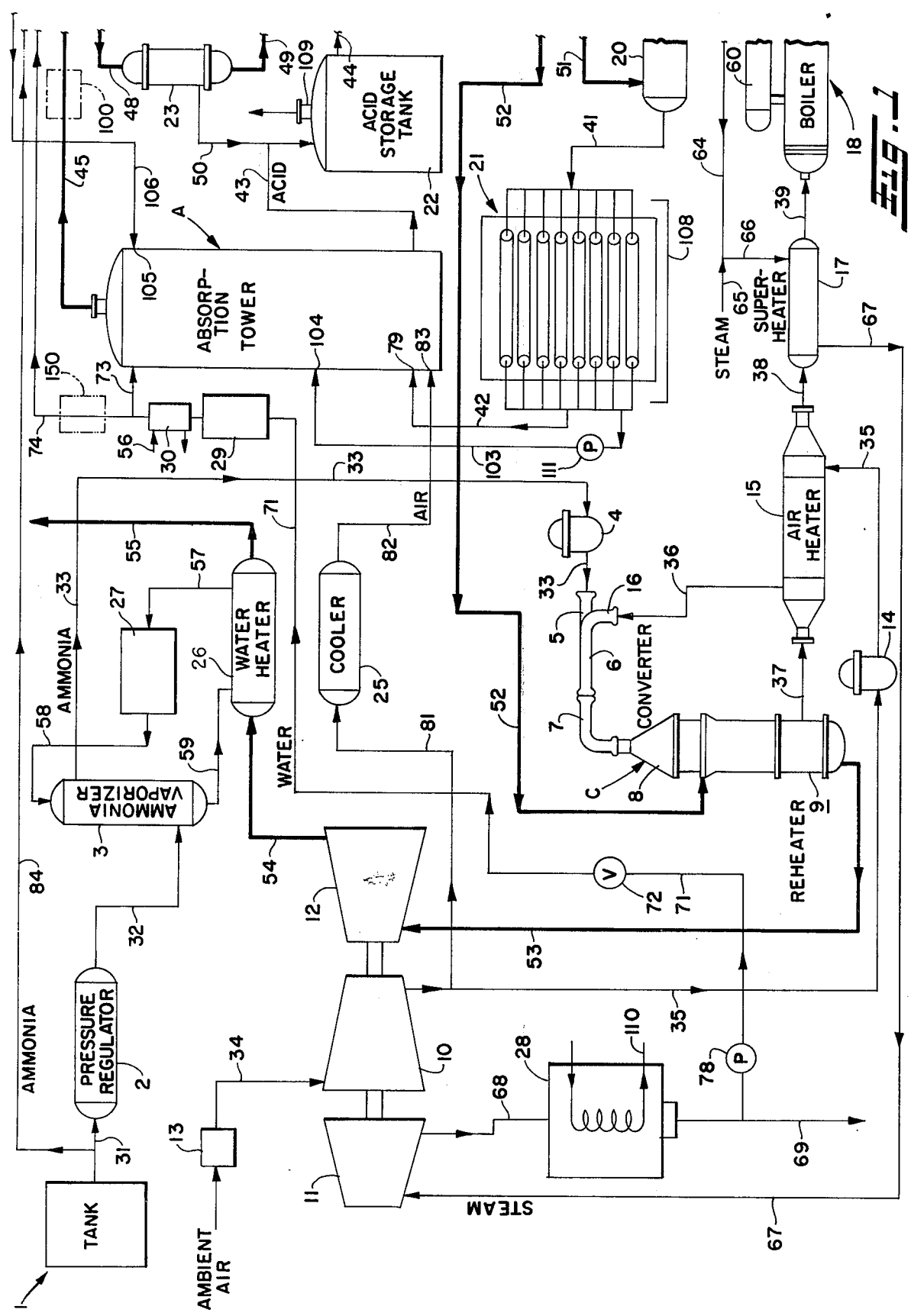

Refering more particularly to the drawings, in which like parts are referred to by the same numerals throughout the several views, FIGS. 1 and 2 show diagrammatically an ammonium nitrate plant constructed according to the present invention having an absorption tower A, a neutralizer B, and an ammonia converter C of conventional construction. Ammonia from the storage tank 1, which is at or near atmospheric pressure, passes through line 31 to the pressure regulator tank 2 where it is heated by steam to provide a predetermined temperature and pressure in line 32, such as 95°F. or 180 psi gage. The ammonia then passes through line 32 and through the water-heated vaporizer 3 to a line 33 and through a filter 4 to the inlet 5 of a gas mixer 6, where the ammonia is mixed with hot compressed air. The gas mixture then passes through the L-shaped conduit 7 and the conical upper portion 8 of the converter C to a conventional catalyst located at the bottom of portion 8 and reacts exothermically to form oxides of nitrogen while raising the temperature to a high value, such as 1700° to 1800°F. or higher. The hot gases in the converter are cooled by the tail gases passing through the coils of a conventional reheater 9 and then leave through the line 37.

The air is supplied to the converter C from a compressor 10, which is driven by a steam turbine 11 and a gas turbine or expander 12. The ambient air passes through an air filter 13 and through inlet line 34 to the compressor and is compressed to a high pressure, such as 80 to 150 psi. The compressed air, which may have a temperature of 200° to 300°F. or higher, then passes through line 35 and the air filter 14 to a conventional air heater 15, where it is heated by the gases from converter C to a higher temperature, such as 500° to 600°F., before passing through line 36 to the inlet 16 of the gas mixer 6.

Part of the compressed air from line 35 (for example, 20 to 30 percent) passes through line 81 to a water-cooled bleach air cooler 25 and through line 82 to the air inlet 83 at the bottom of the absorption tower A.

The reacted gases leave the reheater 9 at a high temperature, such as 1000° to 1100°F., and are progressively cooled by a series of heat exchangers. These hot process gases first pass through line 37 to the air heater 15, through said heater and line 38 to the steam superheater 17, and through the latter and line 39 to a conventional waste heat boiler 18 having a steam drum 60. The precess gases pass through the tubes of the boiler which are covered with water, the liquid level being above the tubes in the drum 60. The process gases leaving the boiler, which by then have been cooled to a lower temperature, such as 400° to 500°F., move through the line 40 and through a catalyst filter 19 (i.e., platinum filter) to a tail gas preheater 20 wherein the process gases are cooled another 100° or so by the tail gases moving toward the expander 12.

The process gases containing nitrogen oxides and water then pass through line 41 to a conventional cascade cooler or cooler-condenser 21 where much of the water present in the gas is condensed. Cooling may be effected by water from a river, lake or other source flowing over the condenser into the sump 108. The nitrogen dioxide of the process gases reacts with the condensed water to produce acid which is present in the condensate. A pump 111 is provided in line 103 to pump such condensate from the condenser 21 to the inlet 104 of the 35-tray absorption tower A, which may be located about one-third of the way up the tower at or near the 11th or 12th absorber tray. The temperature of such condensate is usually no more than about 60°C. The uncondensed process gas, which may contain 8 to 10 percent by weight of nitrogen oxides, flows from the condenser 21 through line 42 to the gas inlet 79 at the base of the tower A. Nitric acid is formed and nitric oxide (nitrogen monoxide) is partially reoxidized as the gas rises through the tower. The liquid removed from the bottom of the tower and pumped through line 43 to the nitric acid storage tank 22 may contain, for example, 54 to 56 percent by weight of nitric acid. In most nitric acid plants, the liquid delivered to the acid storage tank will contain 50 to 60 percent of nitric acid, but a few plants can produce 60 to 70 percent nitric acid.

The tail gas leaving the tower A passes through conduits 45, 46, 47 and 48 and then enters a conventional mist separator 23 wherein more water and acid are removed and discharged through line 50 to the tank 22 at a point spaced from the vent 109. The tail gas then moves through line 49 to a steam-heated tempering heater 24, which receives plant steam through line 61 and discharges the condensate through line 62. The heated tail gas then moves through line 51 to a conventional tail gas preheater 20 and through line 52 to the reheater 9 wherein the tail gas is heated from a moderate temperature, such as 200° to 300°F., to a high temperature, such as 1000° to 1200°F., before it enters the line 53 leading to the expander 12. The temperature at the turbine inlet is usually in the range of about 840° to about 1300°F., (i.e., 450° to 700°C).

During normal operation of the plant, the heat generated by the exothermic reaction in the converter C provides a large amount of power for the turbine 12 which may be sufficient to drive the compressor 10 without help from the steam turbine 11. The latter turbine is important, however, as a means for starting the plant and as a means for controlling the speed of the compressor 10 and/or the amount of power supplied thereto. Adequate control can usually be provided even if the rated capacity of the steam turbine is only about 10 percent of the power capacity of the expander 12. The expander may, of course, be bypassed during starting.

When the tail gases leave the expander, they pass through exhaust line 54 to a water heater 26 where they are cooled to a temperature, such as 350° to 450°F., before being discharged through line 55 and the exhaust stack to atmosphere. The water is continually circulated through the heater 26, the water tank 27 and the vaporizer 3 by lines 57, 58 and 59 to transfer heat from the tail gas to the ammonia moving from line 32 to line 33. The tank 27 may have a steam heater or other heating means for use when starting operation of the plant.

During normal operation of the plant, the steam for the turbine 11 is obtained by heating the feedwater (or condensate) supplied to the drum 60 of the boiler 18 by line 63. The saturated steam from boiler 18 passes through lines 64 and 66 to the conventional steam superheater 17, and the superheated steam passes to the turbine through line 67. Plant steam may be supplied through line 65 during starting and optionally may be used during peak power periods.

An exhaust line 68 connects the turbine 11 to a conventional condenser 28, which is supplied with river water or other cooling water through line 110. The condenser is preferably maintained under high vacuum to increase the power and efficiency of the steam turbine.

Part of the condensate leaving the condenser may be fed to line 69 or to the absorption tower. As herein shown, part of the condensate is delivered by the condensate pump 78 through the line 71 and past the control valve 72 to a feedwater tank 29. The amount of cooling provided by the condenser 28 may, for example, provide the water in tank 29 with a temperature of about 120° to 150°F. A cooler 30 may be provided to cool the water to a lower temperature, such as 80° to 100°F., before it is discharged through line 73 to the top tray of the absorption tower A. The line 56 of the cooler, like the condensers 21 and 28, may be provided with river water at a temperature below ambient air temperature, such as 40° to 85°F. If it is desired to cool the water in line 73 to a temperature below ambient temperature, ammonia may be employed at the cooler 30.

The equipment described above and shown in FIG. 1 may be of the type commonly used in nitric acid plants and may include pumps, valves, drains, vents and other conventional equipment, which have been omitted from the drawins for convenience. It will be apparent that FIGS. 1 and 2 of the drawings are not to scale and that crossing lines in those figures are intended to indicate that such lines are not connected together.

In the ammonium nitrate plant of this invention, the nitric acid from tank 22 is delivered by pump 77 through line 44 to the acid inlet 112 at the top of the neutralizer B. The ammonia from the storage tank 1 is delivered from line 31 through line 84 to the refrigerator G, from the refrigerator through line 85 to the vaporizer E, and from the vaporizer through line 86 to the inlet 113 at the top of the neutralizer. A very small controlled amount of the ammonia may pass through the branch line 87 from line 86 to the pump tank 88 to control the pH of the liquid in the tank, which liquid may contain as high as 80 to 85 percent by weight of ammonium nitrate.

The neutralizer B is conventional and has L-shaped pipes in plurality (shown schematically in dotted lines in FIG. 2) which carry the acid and ammonia to the bottom of the tank. The bottom horizontal legs of the pipes have discharge openings facing each other so that the acid and ammonia react in the space between those legs to form the ammonium nitrate. The reaction is exothermic and locally heats the liquid in the bottom portion of the tank so that steam is formed in the upper part of the neutralizer. The liquid discharged from the tank has a temperature below 300°F. and passes through outlet 114 and line 91 to the tank 88. The outlet 114 may be located at the normal liquid level $a$ shown in dot-dash lines so that the liquid overflows from the neutralizer to the tank 88. The tank has a vent 92 to atmosphere and a pump 89 which delivers the liquid through line 115 to the large storage tank 90. The ammonium nitrate from the tank is delivered by line 116 to the conventional fertilizer mixing apparatus 80 under control of valve 117 or other suitable means. The ammonium nitrate may also be delivered to other equipment (not shown) for producing dry fertilizer or may be used for other purposes.

The steam from the top of the neutralizer B passes out through line 93, and part of it moves through branch line 101 to a condenser 96, which may be cooled with river water through line 102. The condensate then moves to condensate receiver 97 and out through the line 98. The receiver 97 preferably has a vent 99.

The vaporizer-refrigerator unit E has a heating coil 94 in the enlarged upper section 118 which receives steam from the line 93 or other suitable source and discharges the spent steam and/or condensate into return line 95. The steam from the neutralizer provides adequate heat to the vapor section to assure proper heating and vaporization of the ammonia delivered to the neutralizer even when the temperature of the tail gas in line 45 is relatively low (for example, below 80°F.), and it is unnecessary to heat the tail gas leaving the tower A. However, if desired, a heat control means 100 may be provided in line 45 to control the temperature of the tail gas or to heat the gas to the temperature desired to assure proper ammonia vaporization in unit E.

The unit E has a main refrigerator-absorber section 121 which is constructed to refrigerate the tail gas while at the same time serving as an abatement unit to remove nitrogen oxides from the gas. The section 121 is designed to recover nitric acid and to refrigerate the feedwater, which is returned with such acid to the absorption tower. As herein shown, water from tank 29 or cooler 30 flows through line 74 and branch line 75 to the gas cleaner F, the water being caught in the bottom portion of the gas cleaner tank below the packing material 120 and returned to tail gas line 45 by a pump 139 through line 76. Part or all of such feedwater may pass through line 75, but it is usually desirable to bypass some of it through line 74 to the conduit 45 at a point 119 before the tail gas enters the refrigerator-absorber. Most or all of the feedwater from tank 29 may be fed through line 74 to be refrigerated at unit E, but it is desirable to feed some of the water from tank 29 to line 73 so that some or all of the acid water in line 106 may be fed into the tower below the uppermost trays or into the inlet 104 (for example, directly to one of the trays between tray 12 and tray 30). However, it may be preferable to feed most or all of the acid feedwater to to top tray of the tower A in an existing plant because of the difficulty and cost of modifying the tower. Thus, the flow-through line 73 may be cut off or reduced.

The vaporize-refrigerator E has a main refrigerator-absorber section 121 with flat plates 122 and 123 at the opposite ends thereof and a multiplicity of closely spaced vertical cylindrical tubes 124 extending between and projecting through the plates. The upper section 118 and the lower section 125 of the vaporizer-refrigerator are flanged and bolted to the flanges of section 121 adjacent said plates. The tubes 124 establish communication between the upper and lower sections and allow the ammonia to pass upwardly through the tubes from line 85 to line 86. The plates 122 and 123 seal the ends of the section 121 so the tail gases surrounding the tubes 124 do not leak into sections 118 and 125. The heat from the tail gases flowing through the refrigerator section 121 is transferred radially inwardly through the walls of each tube 124 to the ammonia within the tube. The amount of heat transfer is such as to reduce the temperature of the tail gas in line 46 to 5°C. (41°F.) or below, perferably to about 0° to about 3°C.

The vertical tubes of the refrigerator-absorber section 121 may be closely spaced with the axis of each tube spaced from the axes of all the adjacent tubes a distance of only 1.2 to 2 times the outside diameter of the tubes (preferably no more than 1.5 times said outside diameter) so that there is a large surface provided to receive the condensed liquid and so that there is reasonable gas-liquid contact. Good abatement action is achieved in the abator 121 even if the tubes 124 thereof are smooth and not provided with conventional cooling fins because the liquid will condense on the tubes and run down the outside of the tubes. A conventional heat exchanger can therefore be used. Sufficient water can be introduced to line 45 from the lines 74 and 75 to assure the presence of adequate water on the tubes 124. However, it will be understood that a recirculation line 188 and a recirculating pump 189 may be provided to recirculate water from the bottom portion of tower D to line 45 to provide whatever amount of water is desired in the refrigerator-absorber section 121.

Such recirculating water may be desirable if the refrigerator section 121 is constructed to achieve a high degree of $NO_x$ removal and the surface area of the gas-liquid contact means is large. For example, more water may be desirable if cooling fins are mounted on the tubes 124, such as flat axially spaced radial plates or spiral fins. Such cooling fins may be perforated or may be formed as a rigid wire mesh. Also the spaces between the tubes may be filled with a wire-mesh packing material, such as shown in FIG. 5, or randomly arranged pieces of a conventional packing material, such as shown in FIG. 7, but the pressure drop through section 121 is preferably no more than 0.5 percent or 0.5 pounds per square inch in the plant of FIGS. 1 and 2. The water from line 188 can be recirculated at a rate to assure proper wetting of the packing material.

While the refrigerator portion of the unit E is used for refrigerating gases, the same type of construction may be used in refrigerator section 126 of the refrigerator G to effect cooling of the aqueous urea-nitric acid liquor for the unit D. Thus the ammonia flows through the vertical tubes of the section 126 to refrigerate the liquor surrounding the tubes. The upper and lower sections 127 and 128 of the refrigerator G can be constructed like the lower section 125 or unit E. However, the refrigerator G can be much smaller in size than the unit E.

Various means may be used to refrigerate the tail gas and/or the scrubbing liquids moving toward the abatement tower D. Satisfactory results can be obtained with one vaporizer-refrigerator unit E and one refrigerator unit G as shown in solid lines in FIG. 2, but it will be apparent that more than one refrigerator can be used to cool the tail gas or the scrubbing liquid and that many different arrangements can be used. The refrigerator sections 121 and 126 can obviously be arranged in parallel as well as in series in relation to the flow of ammonia from the storage tank 1 to the vaporizer section 118.

An optional parallel arrangement is shown in FIG. 2 in which a refrigerator 140 of the same construction as the refrigerator G receives ammonia through line 131 and valve 138 and discharges it through line 132 to the line 85. The unit 140 can be much larger than unit G if the recirculating liquid in line 129 is relied upon to effect substantial cooling of the tail gas. The liquid from line 129 and pump 130 passes through inlet line 133 and through the refrigerator to outlet line 134 and then to line 135. If desired, optional valves 135, 136, 137 and 138 may be provided in lines 133, 134, 135 and 131, respectively, to permit optional or limited use of refrigerator 140. Such valves may be adjusted to permit limited flow through the refrigerator with partial flow through valve 137 or may be used to cut off flow to the refrigerator by shutting valves 135, 136 and 138 and opening valve 137. It will be understood that refrigerator 140 is optional and may be omitted along with the associated lines 131–134 and valves 135–138.

When the refrigerator 140 is employed with the valve 137 fully or partially closed, it can be used to maintain the scrubber liquid in line 135 at a very low temperature, such as 0° to 3°C., at all times. If desired, the water in line 188 or the feedwater supplied from tank 29 to the tail gas line 45 may be refrigerated in a similar manner to a temperature of 0° to 5°C. by employing an optional refrigerator 150 in line 188 or in line 74 as shown in broken lines in FIG. 1. Such refrigerator may be constructed similar to or the same as refrigerator 140 so as to be cooled by the ammonia from line 84. The refrigerator 150 is unnecessary and is preferably omitted when the ammonia unit E is employed to refrigerate the tail gas, but could be used to effect a portion of the cooling of the tail gas in unit E.

The cylindrical abatement tower D is constructed and arranged to provide an efficient low-cost means for reducing the nitrogen oxides content of the tail gas to a low value while at the same time recovering more nitric acid and producing more ammonium nitrate to help offset the cost. The tower may be designed to accomplish this with a small pressure drop, such as 1 to 1.5 pounds per square inch or less than 2 percent so as not to reduce materially the efficiency of the existing plant.

As shown herein, the tower D is in the form of a metal tank with a first scrubber section 141 in which the refrigerator tail gas contacts a scrubbing liquid consisting essentially of weak nitric acid, and with second and third scrubber sections 142 and 143 in which the tail gas contacts a refrigerated "Masar" liquor containing water, nitric acid, ammonium nitrate and urea. The latter scrubber sections are connected in parallel to operate in the same manner and may be identical. The several scrubber sections are separated from each other by flat metal plates 144 and 145 or other suitable means which prevent leakage of liquid from one section to the other and allow the liquid to be caught in the bottom portion of each scrubber section 142 or 143. The lower section 141 has a rounded bottom wall to catch the liquid, and the upper section has a similar rounded top wall to direct the tail gas to the line 155.

Each of the three scrubber sections contains a horizontal bed 160 of a suitable packing material which has a depth of at least several feet. An air space is provided below each bed with a height which may be 3 to 10 feet or more. The beds in the different scrubber sections are preferably identical but may be different in depth or may contain a different packing material. A conventional spray means or water distribution means is provided in each scrubber section to direct the liquid over the entire bed, preferably so that it is thoroughly wetted throughout its cross section. A spray is indicated in the diagrammatic drawing as a convenience in illustration, but it is preferred to use a preforated plate or other conventional means for distributing water over a packed column.

The tail gas enters each scrubber section below its bed 160 and may be directed away from the bed by a pipe or nozzle 149 as shown in FIG. 2. Such pipe or any other gas inlet is preferably above the liquid level as in the gas cleaner unit F. Such downwardly directed pipe may be used in one or more of the scrubbers or in unit F but is not essential. As herein shown, the refrigerated tail gas flows to pipe 149 of the first scrubber section through conduit 46, passes through gas-liquid contact bed 160 to the top of that section, and exits through conduit 151.

A conventional de-mist pad 170 is provided in the scrubber 141 above the spray means 148, below the outlet 151, and a short distance from the plate 145 to reduce water loss and increase the recovery of nitric acid for return to the absorption tower (see line 106). This may be a conventional wire-mesh entrainment separator, such as a "York" de-mist pad or a "Metex" Hi-Thruput mist eliminator and may have a vertical depth of 8 to 15 inches.

Half of the tail gas from conduit 151 passes through inlet conduit 152 to the bottom portion of scrubber 142 and through the bed 160 thereof to the outlet conduit 154. The other half passes through inlet conduit 153 to scrubber 143 and through its bed 160 to the outlet conduit 155, which joins the conduit 154 in discharging into the line 47 leading to unit F. The conduit 151–155 and the various other gas conduits have relatively large diameters to minimize flow resistance. The tail gas receives essentially the same treatment in each of the scrubber sections 142 and 143, and the two sections may be exactly the same. While such sections can be connected in series to treat the tail gas in sequence, they are preferably connected in parallel in the plant illustrated herein to minimize pressure drop and resistance to flow. Whether arranged in series or in parallel, the liquid may be supplied to the sections in essentially the same way.

A parallel arrangement may also be used in the bottom of the tower D to minimize pressure drop. It is manifest that the single stage at the bottom of the tower, which receives the recirculated water from line 129, could be replaced by two stages arranged in parallel like the two at the top of tower D. It is also manifest that the packing bed 160 can be cooled either indirectly by refrigerator 140 or directly by ammonia carrying tubes as in refrigerator 121. However, much better results can be obtained using the refrigerator-absorber 121 than can be obtained if the bed 160 is drastically enlarged and provided with ammonia cooling. A deeper bed 160 to effect refrigeration of the tail gas could also result in higher pressure drop.

In each of the three sections, the treating liquid is continuously recycled. In scrubber 141, the weak acid solution is continuously pumped by a motor driven pump 130 from line 129 through line 135 and line 156 to the water distribution means 148, and a small portion of said acid solution is continuously returned to the inlet 105 at or near the top portion of the absorption tower A by line 106 under control of a valve 107 or other means. The amount of water removed is preferably no greater than that entering the scrubber through line 45 with the tail gas (the water entering from lines 74 and 76 plus the water vapor condensed from the gas stream) so that the liquid level in the bottom of the tank D can be maintained above the outlet pipe 129 at all times.

The water circulating system for the scrubbers 142 and 143 includes a motor-driven pump 158 delivering liquid from line 157 through inlet line 159 and the refrigerator G to the outlet line 161. Half of the liquid flows through line 162 to the water distribution means 148 of the uppermost scrubber 143 and the other half flows through line 163 to the water distribution means 148 of the intermediate scrubber 142. The liquid caught in the bottoms of the scrubbers 142 and 143 flow out through outlet lines 164 and 165, respectively, to the line 157 and is returned to the pump. Thus, there is a continuous recirculation of liquid in both scrubber sections.

The treating liquor for secions 142 and 143 is a so-called "Masar" solution containing water, nitric acid, urea and ammonium nitrate. The urea is slowly consumed and must be continually replaced to maintain the desired minimum amount, and some of the Masar solution must be drawn off periodically or continuously to remove excess ammonium nitrate and to remove the water added with the urea at 166. A mixing tank 166 may be provided to mix the desired makeup solution of water and urea, and a pump 167 may be operated whenever it is desired to deliver such solution through the line 168 to the line 157. A blow-down line 169 extends from the line 164 or line 157 to the nitrogen fertilizer mixing unit 80 to deliver a portion of the liquor to said unit. The line 169 is opened and closed by a valve 171. The amount of liquid removed through line 169 may be about the same as the amount added through makeup line 168, and there is no problem in maintaining the desired liquid level at the bottom of each of the scrubbers 142 and 143. The amount of water added at the tank 166 may be controlled so that the ammonium nitrate concentration in the recirculating liquid will reach a high level for use in the fertilizer unit 80.

The gas-liquid contact means of the beds 160 must provide adequate gas-liquid contact at the surfaces of the packing material without providing too much resistance to flow of the gases. As previously pointed out, an excessive pressure drop in the abatement tower D is unacceptable, particularly when such tower is added to an existing facility. FIG. 3 illustrates a metal packing of the conventional Koch Sulzer type which can function in the desired manner in the tower A. Such packing would be formed into a substantially cylindrical form as in FIG. 3 with a diameter corresponding to the internal diameter of the tank D (for example, 8 to 12 feet and a height which may be several feet.) In some cases, two or three of such packed cylinders can be stacked together to form each bed 160. The overall bed height is at least 2 feet, and the diameter of width is in the range of 6 to 15 feet and is usually at least 10 feet.

·The bed 160 of FIG. 3 is formed of a multiplicity of parallel layers or corrugated metal sheets, preferably wire mesh, the corrugations of every other layer being parallel. The corrugations of each layer extend laterally or transversely relative to the corrugations of the next adjacent layer so that the ridges of one layer cross the ridges of the next layer, preferably at substantially right angles. This is illustrated schematically in FIG. 4 wherein the parallel corrugations of the wire-mesh layer 173 are generally perpendicular to the corrugations of the wire-mesh layer 174. This eliminates the need for flat spacer grids which would be required between layers to prevent nesting if all the corrugations extended in the same direction.

The layers of the bed 160 of FIG. 3 are arranged generally in this manner and are sandwiched together so that the ridges of adjacent layers are in engagement at the crossing points. The corrugations provide each metal sheet or screen with strength so that the corrugated layers will remain generally flat or parallel. They also provide inclined passages to facilitate upward flow of the tail gases through the packing. The thickness of each corrugated layer may be from 0.1 to 0.5 inch and may be the same as every other corrugated layer.

As shown in FIG. 3, the packing assembly at 160 is held together by a plurality of metal bands 175 which extend around the bundle. Near the middle portion of the bundle there are provided corrugated sheets, such as sheets 176, 177, 178 and 179, having a generally rectangular perimeter. All of the corrugated sheets of the bed 160 are preferably the same and have the same regular corrugations as illustrated in FIG. 4 except that the inclination of the corrugations alternates and the lengths decrease in a direction away from the center of the bundle so that the cut end edges of the sheets define a substantially cylindrical perimeter or one with a shape to fit the interior surface of the tank D. The latter has grid supports or other conventional supporting means to hold each bed 160 in the position shown in FIG. 2.

Each of the sheets of the bed including sheets 176–179 is preferably formed as a generally flat sheet which may be a perforated sheet metal but is preferably a wire mesh such as woven mesh, a knitted mesh, or a conventional "braided mesh" (like a basket weave with at least several wires bunched together between crossing points). The flat sheet is then "crimped" or, in other words, deformed to provide the regular parallel corrugations as shown in FIG. 4, for example. The shape of the corrugated surface may be similar to a regular sine curve or such as to provide parallel corrugations of uniform substantially V-shaped cross section.

The sheets are cut to a rectangular shape, either before or after they are corrugated, and are formed so that the corrugations extend at an angle of 30° to 60° (for example, 40° to 50°) relative to the cut peripheral edge of the sheet. Every other corrugated sheet of the bed 160 has the same parallel corrugations extending in the same direction. Thus, the corrugations or grooves of the layers 176 and 178 are the same, and the corrugations of the layers 177 and 179 are the same but inclined in the opposite direction so that they cross the corrugations of the contacting layers (see FIG. 4, for example).

Because all of the layers of the bed 160 are in vertical positions, there is reduced resistance to gas flow and the tail gas can readily flow upwardy through the inclined passages formed by the corrugations. Because the passages are inclined 20° to 60° relative to the vertical there is good gas circulation and excellent gas-liquid contact in spite of the large volume flow. A Koch Sulzer packing, for example, formed of a fine wire mesh provides excellent results without causing excessive pressure drop through tower D. Such packing is preferred for the beds 160 and for the bed 120 of the unit F.

It will be apparent that the corrugated wire-mesh sheets of the bed 160 may be provided with the advantageous vertical position in various ways. The parallel arrangement of layers shown in FIG. 3 is convenient, but it is not essential because the layers need not be flat but can have a curved shape or other shape. For example, the corrugated sheets could be arranged in a spiral, like the bed 180 of FIG. 6, with the inclination of the corrugations alternating from convolution to convolution.

The wire mesh sheets used in the beds 120, 160 and 170 may be formed of a wire of round or flattened cross section having a suitable diameter, usually in the range of about 0.01 to about 0.1 inch and preferably no more than about 0.05 inch. A flattened wire may have a width up to 4 times its thickness. In a Koch Sulzer packing the wire diameter is preferably no greater than about 0.05 inch. The wire is preferably formed of a corrosion-resistant metal, such as stainless steel or the like. The wire can be coated with a metal, a synthetic resin or other material to resist corrosion, and some of the wire can be in the form of monofilaments of filaments of non-metallic materials, such as nylon, Teflon or glass. The mesh openings usually range from 5 to 25 per inch and the wire-mesh sheets are usually formed in widths no greater than about 4 feet and lengths which may be several hundred feet.

Various packing materials are suitable for use in the de-mist pad 170 and the mist separator 23. For example, a conventional de-mist pad is commonly formed by knitting wire mesh of the type illustrated in FIG. 5 which is held together by interlocked loops. This type of mesh is very flexible and allows the size of the wire to be small compared to the mesh opening, but it lacks the strength, rigidity and self-supporting characteristics of woven wire mesh, such as is most commonly used for insect screening. It can, however, be crimped or corrugated for use in a packing bundle of the type shown in FIG. 3.

A long strip 181 of the knitted wire mesh material formed of interlocked bent wires 182 extending in the longitudinal direction may be spirally wound (with or without such crimping) to form a generally cylindrical bundle 180 of a suitable size for use as a packing bed. Such a bundle is suitable for the de-mist pad 170, for example, or could be mounted directly on top of another type of packing, such as that shown in FIG. 3, to form part of one or more of the packing beds 160 in the tower D.

The knitted-mesh packing is formed in a conventional wire knitting machine and may be a "Metex" wire mesh of the type made by Metex Corporation of Edison, New Jersey. Such wire mesh may be provided with the well-known herringbone fold or may be spirally wound or laid flat in a conventional layered mesh arrangement to provide a packing bed with a suitable density, such as 4 to 30 percent metal by volume. These and other variations can be employed in the practice of the present invention. Various other packing materials are suitable, such as "Goodloe" or "Panapak" metal wire packing. Some of the advantages of the present invention may be achieved with less advantageous packing materials, such as Raschig ring packing, Berl saddle packing and the like.

Excellent results may be obtained using "Tellerette" packing 183 as shown in FIG. 7. This packing, made by The Ceilcote Company, comprises an annular hub portion 184 with a series of regularly spaced round radially extending loops 185 arranged like the coils of a helical spring that is held in a toroidal position. The "Tellerette" packing is molded of polyethylene or polypropylene but could also be made of nylon, Teflon or other plastic. It will be understood that metal packing elements of similar shape, such as helically coiled wires, may also be used.

The "Tellerette" packing is superior to other conventional packing because it can provide the desired surface area per unit volume and the desired gas-liquid contact with minimum resistance to gas flow. For example, comparing a so-called "nominal one-inch" Tellerette packing with conventional 1-inch ceramic Raschig rings and conventional 1-inch ceramic Berl saddles, it is found that the free volume provided by the Tellerette packing is about 90 percent as compared to about 66 percent for the Raschig rings and about 69 percent for the Berl saddles. The Tellerette packing requires only about 1000 units per cubic foot as compared to about 1330 for the Raschig rings and about 2200 for the Berl saddles. The Tellerette packing has a surface area of about 55 square feet per cubic foot of space as compared to 58 square feet for the Raschig rings and about 70 square feet for the Berl saddles.

In carrying out the process of the present invention with an abatement tower of the type shown in FIG. 2, it is sometimes preferable to employ in the units 142 and 143 a relatively deep packing bed formed of Tellerettes or comparable packing elements so as to provide more time for reoxidation of the nitric oxide as it passes through the bed. Such parking elements would preferably have loops or rounded portions providing openings with a diameter from about 0.2 to 0.8 inch. The packing should provide a free volume of at least 75 and preferably 80 to 95 percent and a surface area of at least 40 and preferably 50 to 80 square feet per cubic foot. In a plant of the type illustrated herein where the tower D and the packing bed of unit 142 or 143 have a diameter of about 8 to 15 feet, such bed should be filled with Tellerette packing elements to a depth of at least 4 and preferably 5 to 10 feet (i.e., 6 to 8 feet in the 350 ton/day plant of FIGS. 1 and 2).

While it is usually preferred to use a conventional packing arrangement, it will be apparent that the polyethylene or plastic Tellerette packing elements may be used in combination with metal packing, for example, by placing a bed of Tellerette packing material on top of a Koch Sulzer packing bundle at each bed 160. Many different packing combinations are possible when practicing the present invention but care must be taken to achieve the proper gas-liquid contact without causing an excessive pressure drop in the tower D. Such pressure drop must not exceed 2 percent or 2 pounds per square inch in the specific plant described herein and shown in FIGS. 1 and 2, which is rated at 350 tons of nitric acid per day.

The arrangement shown in the drawings is particularly designed for nitric acid plants used in connection with manufacture of ammonium nitrate. Most nitric acid plants are of this type and can effectively utilize the unit E to transfer heat from the tail gas to the ammonia going to the neutralizer. However, the invention also applies to plants which produce nitric acid only and do not use a neutralizer to convert the acid to ammonium nitrate.

In the latter acid plants the unit 121 or other means used to refrigerate the tail gas would transfer the heat to the ammonia being supplied to the converter C but, because the ammonia pressure required for the converter is much higher than that required for the neutralizer B, the amount of ammonia cooling available for chilling the tail gas is much less. Therefore, in order to reduce the temperature of the tail gas leaving the absorption tower A to below 40°F., it may be necessary to provide, in addition to such ammonia cooling, additional cooling, such as conventional mechanical refrigeration. Also the unit 100 shown in broken lines in tail gas conduit 45 could be cooled by river water or other cooling liquid to reduce the temperaure of the tail gas to 70° to 80°F. or below. It is seen from this that the abatement equipment for a nitric acid plant withouot a neutralizer will be generally the same as that shown in the drawings except that the refrigeration of the tail gas to a temperature of 40°F. or below will be difficult and more expensive.

The equipment shown in FIG. 1 of the drawings (without the new units D, E and F and related equipment) comprises a standard ammonium nitrate plant which, prior to the present invention discharged the tail gases directly from the absorption tower A through conduit 45 to the mist separator 23 and thereafter to the stack at line 55. In the past, when operated in that manner, the tail gas coming out at the stack would have a red color and would commonly contain 2000 to 3500 parts per million by volume of nitrogen oxides. A plant of the type illustrating construction according to the present invention can have a capacity varying from 200 to 600 tons of acid per day. Generally the equipment used and the pressures and temperatures employed may remain the same as the capacity is increased except that the equipment is larger and the volume of gases delivered from the compressor is greater.

The figures given below apply to a plant with a normal capacity of 350 tons per day operating in a normal or average way, it being understood that such capacity can vary from about 310 to about 400 tons per day depending on the season, the ambient air temperature, and the temperature of the cooling water. Unless the contex shows otherwise, the following description will apply specifically to such a 350 ton/day plant. However, it will be apparent that the size of the plant and operating conditions may vary considerably when practicing this invention.

The 350 ton/day plant described herein for purpose of illustration employs a gas turbine 12 with a capacity of about 8,000 to 10,000 horsepower, a steam turbine 11 with a capacity of about 800 to 1000 horsepower, and a compressor 10 which can deliver a maximum of about 40,000 cubic feet of air per minute at a pressure of 120 pounds per square inch gage. When operated at its normal capacity of 350 tons per day without units D, E and F and with conduit 45 connected directly to the unit 23, the compressor 10 discharges 161,500 pounds of air per hour at 300°F. and a pressure of 120 psi gage. When so operated, 36,500 pounds of bleach air per hour is supplied to the absorption tower through line 82 at a temperature of about 212° to 240°F., and 125,000 pounds of air per hour is supplied to the air heater 15 at 300°F. and to the gas mixer inlet 16 at 595°F. and 116 psi gage. At the same time about 8,500 pounds per hour of ammonia are supplied to line 32 at a temperature of 95°F. and a pressure of 180 psi gage and to the gas mixer inlet 5 at 150°F. and 116 psi gage. The gas mixture, which may contain about 18.5 percent oxygen, 69.7 percent nitrogen, 10.3 percent ammonia and 1.5 percent water (by volume), is delivered to the converter C at a rate of about 133,500 pounds per hour at 535°F. and 114 psi gage, and the reacted gases leave through line 37 at the same rate but at a temperature of 1052°F. and a pressure of 110 psi gage.

The temperature of these gases is reduced to about 810°F. at line 38 entering the superheater 17, to about 787°F. at line 39 entering the boiler 18, to about 485°F. at line 40 entering the preheater 20, and to about 384°F. (and 103 psi gage pressure) at the line 41 entering the cooler-condenser 21. From the condenser about 109.500 pounds of gas per hour are delivered through line 42 to the bottom of the absorption tower at a temperature of 120°F. and a pressure of about 99 psi gage, and 24,000 pounds per hour of the condensate containing 48–49 percent by weight of nitric acid are delivered through line 103 to the 11th tray of the tower A at inlet 104 at a temperature of 102°F. and a pressure of 103 psi gage. The gas in line 42 may contain about 90.8 percent nitrogen, about 7.7 percent of nitrogen oxides, 1.4 percent of water, and 0.1 percent of oxygen, and the bleach air in line 82 may contain about 20.6 percent oxygen (by volume).

The multi-stage absorption tower A is designed to receive 12,460 pounds per hour of feedwater to the top tray from line 73 at a temperature of 100°F. and a pressure of 125 psi gage, to discharge through conduit 45 and directly therefrom through the mist separator 23 to the tempering heater 24 about 130,500 pounds per hour of tail gas at 95°F. and 93 psi gage in line 49, and to discharge through line 43 about 52,000 pounds per hour of liquid containing about 54 to 56 percent nitric acid and about 44 to 46 percent by weight of water. The tail gas temperature is raised to about 150°F. in line 51 from the heater 24, to about 300°F. in line 52 from the heater 20, and to about 1100°F. in the line 53 from the reheater 9. The tail gas enters the expander 12 from line 53 at a temperature of about 1100°F. and a pressure of about 86 psi gage, is discharged through line 54 at a temperature of about 565°F. and a pressure of about 0.6 psi gage, and is discharged to line 55 from the water heater 26 at a temperature of about 425°F. and a pressure of about 0.3 psi gage. When operated in this way, without the abatement equipment of this invention, the stack discharges reddish-brown gases which may contain 2500 to 3500 parts per million of nitrogen oxides plus abouot 94 to 95 percent nitrogen, about 3 to about 4 percent oxygen and about 0.7 to 1 percent water (by volume).

The absorption tower is conventional and may be of different types. The tower A shown here is a conventional countercurrent absorption tower having 35 bubble-cap trays, each tray containing water which overflows to the next lower tray. Except for the one or two bottom trays receiving the bleach air, all of the 35 bubble-cap trays are cooled by river water or other cooling water flowing through conventional cooling coils. In the specific example given, trays 1 to 5 (above the aforesaid two bottom trays) have four layers of such cooling coils, trays 6 to 17 have three layers of such coils, trays 18 to 22 have two layers of such coils, and trays 23 to 35 including the uppermost tray have one layer of such coils. Thus, most of the cooling of the tail gas takes place in the lower half of the tower A. This construction is conventional and common in the industry. In the example given herein, the inlet 104 is located at tray 11 about one-third of the way up the tower, and the line 73 is located to discharge into the top tray. When the tower is modified according to the invention, the weak acid from line 106 may be discharged through inlet 105 to such top tray or, if other water is supplied to that tray, may be discharged directly to one or more lower trays, such as one of trays 20 to 30.

When the conventional nitric acid plant description above with reference to FIG. 1 is modified by adding the line 106 from unit D and by passing the tail gas from the absorption tower through the units D, E and F before it is discharged through the mist separator, the elements of the plant shown in FIG. 1 operate in substantially the same way as before, but there is a greater pressure drop and temperature drop between conduit 45 and the mist separator 23 requiring more power input to the compressor 10. However, the loss in efficiency is substantially offset by the recovery of heat from the tail gas at vaporizer E and substantial production of nitric acid and ammonium nitrate by abatement units D and E.

The pressure drop between line 45 and line 48 caused by the resistance to flow in units D, E and F is less than 2 pounds per square inch (less than 2 percent) and can be reduced to about 1 pound to 1.5 pounds per square inch in a plant of the type shown in FIGS. 1 and 2. The packing beds 160 of the abatement tower D are selected to cause a pressure drop in the tower of no more than 2 pounds and preferably about 0.8 to 1.5 pounds per square inch. Because the pressure drop due to the new abatement equipment is low (for example, 1 to 2 percent), the amount of power required by compressor 10 is minimized and satisfactory operation of the plant can be achieved with the existing expander 12 and the other existing equipment of the plant without undue capital investment in new equipment. The present invention is, therefore, extremely well suited for conversion of existing ammonium nitrate plants.

For example, in the 350-ton/day plant of FIGS. 1 and 2 where the pressure drop from conduit 45 to conduit 48 caused by the new equipment is 1 to 1.5 pounds per square inch, the equipment of FIG. 1 will function generally the same as before the addition of the new equipment if the output pressure of the compressor 10 is increased from 120 to about 121 to 121.5 pounds per square inch. The additional power for this pressure increase may be supplied by the existing steam turbine 11 because such turbine normally operates well below its maximum capacity. The same will usually be true in a plant having the auxiliary power provided by an electric motor instead of a turbine. If more power should be desired, a relatively small auxiliary compressor could, for example, be placed in line 34 in series with compressor 10 and driven by an auxiliary electric motor or steam turbine.

The following is given as an illustrative example of how the plant may be operated, it being understood that the operating conditions can vary substantially when carrying out the process of this invention. Assuming that the equipment is operated to deliver about 162,000 pounds of air per hour from the compressor 10 at about 121 to 122 pounds per square inch, the operating temperatures and pressures for the conventional plant equipment of FIG. 1 can remain about the same as those given above by way of example for the plant as operated prior to this invention. In this particular example all of the feedwater for the absorption tower A would come from line 106, line 73 would be disconnected or blocked off, and refrigerator 140 and other optional units 100, 150, 188, 189, 200 and 300 would be omitted.

Ammonia from storage tank 1 would enter refrigerator G from line 84 at a temperature of about −20° to −29°C. and would be heated to about −7° to −6°C. before entering line 85 to the refrigerator-absorber 121. The latter would effect cooling of the tail gas to a temperature of about 2°C.

The refrigerator-absorber 121 may comprise about 280 cylindrical tubes of 10-gauge stainless steel with an outside diameter of 2 inches and a length of about 15 feet. The tubes may be regularly spaced with the axis of each tube spaced about 2.8 inches from the axes of all the adjacent tubes. The water in the tail gas would condense and run down on the outside of the tubes while reacting with the nitrogen dioxide. The ammonia pressure inside the tubes would be about 35 pounds per square inch gage, and the tail gas pressure in the unit 121 would be around 100 pounds per square inch gage.

The tail gas leaving the absorption tower A should contain about 0.23 to 0.24 percent nitrogen oxides, about 3 to about 4 percent oxygen and at least 94 or 95 percent nitrogen by volume. About 25 gallons per minute of water would be introduced into the tail gas from the line 74, at least 15 to 20 gallons per minute being passed through the gas cleaner F. The water would be pumped through line 74 at a temperature of about 38°C. but could be cooled in cooler 30 to a lower temperature to help maintain the desired tail gas temperature in line 46.

A small reservoir of water would be maintained in the bottom of the tower D below gas outlet 149 at a substantially constant level while recirculating the water and acid through pump 130 at a suitable rate between 100 and 200 gallons per minute, such as 150 to 180 gallons per minute, and continually returning water through line 106 to the top tray of the absorption tower A at a rate of about 25 gallons per minute. The refrigerated tail gas would lower the water temperature to about 4°C. at the bottom of the tower D.

In this example, each of the beds 160 would be formed of conventional Koch Sulzer packing as shown in FIG. 3 and would have a diameter of about 10 feet and a height of about 2 to 4 feet or sufficient to permit a reduction of the nitrogen oxides content of the tail gas 40 to 50 percent or more as it moves through the first scrubber 141 from line 46 to line 151. The pad 170 of the first scrubber section would be a conventional York de-mist pad, and the water distribution means 148 of each of the three scrubber sections would be the same — a standard water distribution plate for a packed column.

The pump 158 would recirculate the Masar liquor through the second and third scrubber sections 142 and 143 at about the same rate as pump 130 and at a rate sufficient to maintain thorough wetting of the Koch Sulzer packing beds 160. The refrigerator G would maintain the temperature of the liquor at about 2°C. so that the tail gas in conduit 47 had a temperature no greater than about 4° to 5°C.

The Masar liquor would comprise an aqueous solution of ammonium nitrate, water, urea, and nitric acid containing at all times about 0.5 to 1.5 percent urea and at least about 0.3 percent nitric acid. In the present example the Masar liquor contains about 0.3 to 1 percent nitric acid, and a controlled amount of makeup solution is added through line 168 to maintain about 1 to 2 percent urea while a comparable amount of liquor is removed through line 169. Such makeup solution, which usually consists of about 50 to 75 percent water and about 25 to 50 percent by weight urea, is pumped through line 168 to the recirculating liquor in line 157. The amount of water added with the makeup solution is limited and may be adjusted to help obtain the desired ammonium nitrate concentration of 10 percent or greater. The process can be carried out to provide the Masar liquor with a nitrate ion content equivalent to an ammonium nitrate concentration of at least 10 percent and preferably 12 to 20 or 25 percent.

About 130,000 pounds per hour of tail gas would flow from the absorption tower A to the refrigerator-absorber section 121 and thereafter flow through the abatement tower D. The pressure of the gas would drop from about 100 psi in line 45 to about 98 or 99 psi in line 47 due to the resistance of the packing beds, and the temperature would drop to about 3° to 5°C. in line 47 due to the refrigeration in unit E and in scrubber sections 142 and 143.

If operated in the winter in the manner described above with tail gas discharged from tower A to conduit 45 containing about 3 to 3.5 percent oxygen and about 0.23 to 0.24 percent nitrogen oxides by volume, the nitrogen oxides content would be reduced to about 900 to 1200 parts per million by the time the tail gas is discharged from gas scrubber 141 to line 151 and would be further reduced to below 400 parts per million in the scrubbers 142 and 143.

If operated in the summer in the manner described above with tail gas discharged from tower A to conduit 45 containing about 4 to 4.3 percent oxygen and about 0.3 percent nitrogen oxides by volume, the $NO_x$ content would be reduced to about 1000 to 1300 parts per million at line 151 and to below 400 parts per million in the scrubbers 142 and 143. In this instance the $NO_x$ content can be reduced by the refrigerator-absorber unit 121 from more than 3000 parts per million to substantially less than 2000 parts per million by volume, and, if desired, the unit 121 can be designed to reduce this to 1700 to 1800 parts per million or less.

Whereas, prior to this invention, the plant capacity was commonly reduced to around 340 tons per day on hot summer days, the process of the present invention would make it possible to recover 5 to 7 or more tons per day of nitric acid as acid or as ammonium nitrate while at the same time providing the same reliable $NO_x$ abatement as is achieved in the winter without requiring use of excessive amounts of urea. The process is particularly useful for nitric acid plants located in warm climates.

If, in the above example, the tail gas from tower A contained anywhere from 3 to 5 percent oxygen and anywhere from 3000 to 4000 parts per million of nitrogen oxides, the unique combination of refrigerator-absorber 121 and gas scrubber 141 should, when properly constructed, be capable of reducing the $NO_x$ content to below about 1200 parts per million while recovering very substantial amounts of nitric acid for return to tower A. If the $NO_x$ content of the tail gas in conduit 45 should be as high as 4000 to 4500 parts per million, the unit 121 can be constructed to reduce it more than 50 percent and to well below 2000 parts per million before it enters scrubber 141.

If it is desired to make the units more effective, the temperature can be lowered closer to the freezing point of the water solution. For example, the temperature of the recirculating liquid in unit 141 could be lowered by use of the optional refrigerator 140 to a temperature somewhat below 1°C. Also, if desired, such refrigerated water could be recirculated through line 188 by the optional pump 189 at a substantial rate, such as 25 to 100 gallons per minute, to assist in cooling the tail gas in unit E and to improve absorption and removal of the nitrogen dioxide. Absorption can be improved by maintaining the desired acidity of the liquid flowing over the tubes of section 121.

The $NO_x$ abatement can also be improved by feeding compressed bleach air from compressor 10 to line 45 or by increasing the bleach air to tower A, but this can materially reduce the plant efficiency and is not recommended. If, however, the tail gas contains less than 3 percent oxygen by volume, additional bleach air may be desirable.

The present invention is advantageous because it can function well at a wide variety of oxygen levels and can be used even when the oxygen content of the tail gas from the absorption tower is greater than 5 percent. This is not true of the catalytic combustion abatement systems wherein the oxygen content must not exceed 3 percent and is often kept down to around 2.5 percent even though this necessarily results in a significant reduction in the plant efficiency, especially in the summer months. While the catalytic combustion process is least desirable in the summer when the plant efficiency is lowest, the process of the present invention is most helpful at that time.

For these and other reasons, it should be more practical for nitric acid manufacturers to use the abatement system of the present invention than the catalytic combustion system. The latter has been found to be unpredictable and not suitable for achieving consistent $NO_x$ emissions below 300 parts per million. The process of the present invention is at least as effective and is cheaper and more reliable. Furthermore, the process of this invention is compatible with other abatement systems which can reduce the $NO_x$ level well below 200 parts per million.

For example, because the $NO_x$ content in line 47 is relatively low, it becomes feasible to employ oxidation means and chemical scrubbers which would otherwise be too expensive. Abatement may be achieved by adding to line 47 another gas scrubber similar to scrubber 141, such as a gas scrubber 300 shown in broken lines in FIG. 2, wherein a treating liquid is continually recirculated through a conventional packed column. The treating liquid may contain hydrogen peroxide, potassium permanganate or other oxidizing agent or may comprise aerated or oxygenated water.

In carrying out the process of this invention, the equipment used may be of varying types, and it will be understood that the invention is not limited to the specific equipment shown in the drawings. Likewise, many of the elements shown in the drawings can be omitted. The abatement tower D can employ cross-current or cocurrent flow of the liquid relative to the gas as well as countercurrent flow and can effect the needed refrigeration of the tail gas or the liquid by direct refrigeration of either the water or the gas or both. The preferred equipment is shown in FIG. 2, omitting the optional elements 140, 188, 200 and 300. However, special means may be provided to facilitate close temperature control in units 121, 141, 142 and 143, especially where the units are operated at temperatures below 2°C. The refrigerator 140, for example, may be used to help maintain a fixed temperature in scrubber 141, such as 0° to 3°C. At the same time the line 188 and pump 189 could be used to the extent necessary to maintain the desired temperature in section 121.

While the gas scrubbers used in the process of this invention are preferably of the type described in connection with FIG. 2 of the drawings, pilot plant tests have shown that advantages of this invention may be obtained using other arrangements. For example, tests have been carried out using a three-stage pilot abatement unit arranged for cocurrent flow of the gas and liquid and having a cylindrical tower with three conventional York demister pads spaced vertically several feet apart to provide air spaces between the pads for oxidation of the nitric oxide. Each of said pads formed a packing bed made up of layers of wire mesh and had a vertical depth of about 10 inches, and each pad had a separate water distribution means above it to distribute refrigerated liquid over the entire pad continuously and keep it thoroughly wet throughout the test. An equal amount of liquid was supplied directly to each stage through said water distribution means, and the liquid was allowed to move downwardly through the packing beds to the bottom of the tower where it was collected, recirculated through a heat exchanger or chiller by a recirculating pump, and returned to the water distribution means at a low temperature. The tail gas entered the top of the tower at a moderate temperature, such as 30° to 40°C., flowed down through the three spaced packing beds, and flowed out of the bottom portion of the tower at a relatively low temperature, such as 5°C.

In one test about 248 standard cubic feet per minute of tail gas from a nitric acid plant of the type shown in FIG. 1 having a temperature of about 90°F. (about 32°C.) and containing about 1680 parts per million by volume of nitrogen oxides were passed through the three-stage cocurrent abatement tower described above at a pressure of about 80 pounds per square inch gage. This tail gas left the bottom of the tower at a temperature of about 43°F. (about 6°C.) and contained less than 400 parts per million by volume of nitrogen oxides. In this test the treating liquor contained about 0.39 percent by weight of nitric acid and about 1.07 percent by weight of urea and was cooled to a temperature of about 38°F. in the chiller. About 2.3 gallons per minute of this liquor was continuously fed to each stage of the tower, and the total flow was around 6.8 to 6.9 gallons per minute.

In another test of the same equipment, about 272 standard cubic feet per minute of tail gas from the nitric acid plant having a temperature of about 103°F. and containing about 1670 parts per million by volume of nitrogen oxides were passed through the tower at a pressure of about 80 pounds per square inch gage while supplying each stage with about 2.3 gallons per minute of a treating liquor having a temperature of 29° to 30°F. and containing about 0.13 percent by weight of nitric acid and about 2.5 percent by weight of urea. The tail gas left the bottom of the tower at a temperature of about 36°F. and contained less than 300 parts per million by volume of nitrogen oxides.

Pilot plant tests have also indicated that advantages of the present invention may be obtained when using polyethylene "Tellerette" packing of the type shown in FIG. 7 of the drawings. For example, a tubular tower with an outside diameter of 14 inches and an inside diameter of about 13.63 inches was packed with Tellerette packing to form a bed having a depth of about 73.5 inches. The Tellerette packing was of the so-called nominal "1-inch" size, meaning that the loops had an outside diameter of almost three-fourths inch and the toroid had an outer diameter of about 1.8 to 1.9 inches. The cross section of each loop was square with a width of about one-eighth inch. The packing was of conventional construction and had the typical random arrangement in the bed.

In the pilot plant tests the tail gas from the nitric acid plant was passed downwardly with the liquid through the Tellerette packing bed of the tower while liquid was continuously supplied to the top of the bed by a full cone spray nozzle to wet the bed thoroughly. In one test about 233 standard cubic feet per minute of tail gas at a temperature of about 127°F. and a pressure of about 70 pounds per square inch gage and containing about 2,420 parts per million by volume of nitrogen oxides was passed down through the Tellerette packing bed while supplying about 6 to 6.3 gallons per minute of a treating solution having a temperature of about 39°F. and a pH of about 1.4 and containing about 0.54 percent by weight of nitric acid and about 0.17 percent by weight of urea. The tail gas leaving the bottom of the tower had a temperature of about 50°F. and contained about 440 parts per million by volume of nitrogen oxides.

In another test, around 205 standard cubic feet per minute of tail gas at a temperature of about 120°F. and a pressure of about 78 pounds per square inch gage and containing about 2,540 parts per million by volume of nitrogen oxides were passed downwardly through the packing bed while supplying about 6 to about 6.3 gallons per minute of a treating solution having a temperature of about 37°F. and a pH of about 2.1 and consisting of 1.40 percent nitric acid, 3.31 percent urea, 26.34 percent ammonium nitrate and the balance water. The tail gas leaving the bottom of the tower had a temperature of about 47°F. and contained less than 300 parts per million of nitrogen oxides.

In the examples of pilot plant tests given above, the flow was cocurrent rather than countercurrent and the pressures were somewhat lower than employed in most high-pressure nitric acid plants. Better results are obtained using higher pressures and countercurrent flow.

The tests above show reduction in $NO_x$ content of the tail gas when scrubbing with a nitric acid-urea solution. However, in these examples the consumption of urea is excessive and several times what is desired. The arrangement of FIG. 2 makes it possible to reduce the $NO_x$ content to 0.1 percent by volume or less before the urea scrubbing is initiated. This makes it possible to reduce the urea consumption to an acceptable level while at the same time recovering useful ammonium nitrate fertilizer.

Pilot plant tests have shown that the $NO_x$ content of the tail gas may be reduced more than 40 percent in an ammonia-cooled refrigerator-absorber similar to unit 121 of FIG. 2 when water is addded to the tail gas entering the unit. In the pilot plant test, the refrigerator-absorber had about 52 vertical tubes with a length of about 8 feet arranged with the axis of each tube spaced about fifteen-sixteenths inch from the axis of each adjacent tube. Each tube was 16-gauge stainless steel with an outside diameter of three-fourths inch. The ammonia in the vessel surrounding the tubes caused the water in the tail gas to condense and flow down the inside surfaces of the tubes.

In one test about 183 standard cubic feet per minute of tail gas containing about 3,500 parts per million by volume of nitrogen oxides was delivered to the top inlet of the refrigerator-absorber at a temperature of about 126°F. and a pressure of about 80 pounds per square inch gage along with about 0.31 gallons per minute of water. The ammonia pressure in the vessel surrounding the tubes was about 46 pounds per square inch. The tail gas leaving the bottom portion of the unit had a temperature of about 38°F. and a pressure of about 73 pounds per square inch and apparently contained about 1,910 parts per million by volume of nitrogen oxides.

It is believed that a simple refrigerator-absorber such as unit 121, in a high-pressure ammonium nitrate plant of the type shown in FIG. 2 can reduce the $NO_x$ content from 3000 to 4000 parts per million to less than 1800 parts per million and that a water scrubber such as unit 141 can further reduce the $NO_x$ content to 1000 to 1200 parts per million or lower before the tail gas enters scrubbers 142 and 143.

The process of the present invention can be used to improve nitric acid plants of various sizes and various types including dual-pressure plants described hereinafter wherein the ammonia converter is operated at low pressure. It is well suited for high-pressure or medium-pressure plants handling large volumes of gas, such as those with a capacity of 200 to 800 tons of acid per day or greater. The process is particularly well suited for a nitric acid plant with a compressor delivering 80,000 to 300,000 pounds of gas per hour to the converter and/or the absorption tower at a pressure of 5 to 10 atmospheres and a gas turbine receiving tail gas at a temperature of 450° to 700°C. to provide efficient power recovery. For example, the process of this invention can be applied to an existing ammonium nitrate plant of the type illustrated in FIG. 1 having a compressor delivering at least 120,000 pounds of air per hour at a pressure of at least 5 atmospheres and having a conventional 25- to 40-stage countercurrent bubble-cap tower producing 200 to 600 tons of nitric acid per day. The process reduces the emission of nitrogen oxides from the plant to substantially less than 6 pounds per ton of nitric acid produced and can, for example, reduce such emissions to 4 to 5 pounds per ton of nitric acid in a plant producing 200 to 300 or more tons of nitric acid per day or in larger plants producing 600 or more tons of acid per day.

In a typical ammonium nitrate plant it is necessary to reduce $NO_x$ emissions below 400 parts per million by volume to achieve a total $NO_x$ emission substantially less than 5.5 pounds per ton of acid.

The nitrogen oxides content of the tail gas discharged from the absorption tower can vary substantially when practicing the present invention and will vary at different times of the year from about 0.2 to about 0.4 percent by volume. It is at least 0.15 percent by volume and is usually about 0.25 to about 0.35 percent by volume. In the ammonium nitrate plant of FIGS. 1 and 2, the tail gas from the absorption tower A may, for example, contain 3 to 4 volume percent oxygen and about 2300 to about 4000 parts per million by volume of nitrogen oxides. The temperature of such tail gas may, for example, be from about 25° to about 70°C.

In passing from conduit 45 through the refrigerator-absorber 121 to the conduit 46, the tail gas has its temperature reduced from 25° to 30°C. or higher to less than 7°C. and preferably no more than 3°C. and has its nitrogen oxides content reduced substantially (for example, 20 to 40 percent). For example, the $NO_x$ content of the tail gas can be reduced in unit 121 from 0.25 percent to 0.40 percent to no more than 0.18 percent by volume with a very small pressure drop (less than 0.5 percent or substantially less than 0.5 psi in the plant of FIGS. 1 and 2).

The nitrogen oxides content of the tail gas can be reduced 40 to 60 percent or more as the gas passes through the water scrubber 141 from conduit 46 to conduit 151. For example, it can be reduced from 0.16 to 0.18 percent in line 46 to below 0.12 percent in line 151. The units 121 and 141 are preferably designed to reduce the $NO_x$ content of the tail gas to no more than about 0.1 percent in line 151.

As the tail gas passes from line 151 through the scrubbers 142 and 143 to the line 47, the nitrogen oxides content is reduced at least 50 percent and preferably below 0.04 percent by volume. For example, the $NO_x$ content may be reduced from more than 800 to less than 400 parts per million by volume as the tail gas moves through scrubbers 142 and 143.

When an ozone generator 200 or a hydrogen peroxide scrubber 300 is also employed, the $NO_x$ content can be reduced to well below 200 parts per million before the tail gas reaches the heater 24.

The temperature of the tail gas is maintained below 7°C. and preferably not in excess of 5°C. as the gas passes through water scrubber 141, and best results are obtained by maintaining the gas temperature below 3°C. The temperature of the tail gas can be lowered by the refrigerated treating liquor in scrubbers 142 and 143 to 2°C. or below. The tail gas temperature in these scrubbers is maintained not in excess of 5°C. and preferably not in excess of 3°C. The refrigerator G may be constructed to maintain the recirculating liquor at a temperature not in excess of 2°C. and above the freezing point of the liquor. Likewise, if the refrigerator 140 is used, it can maintain the recirculating liquid at a low temperature, such as 1° to 2°C.

The liquid is recirculated through the scrubbers 141, 142 and 143 at a rate sufficiently high to wet the packing beds 160 thoroughly and to achieve effective absorption of the nitrogen dioxide. The weight flow of the recirculating liquid per unit of time through each packing bed 160 is usually from about 0.4 to 2 times the weight flow of the tail gas through that bed but may be much greater. If refrigeration of the tail gas is effected by the liquid in unit 141, for example, the weight rate of flow of recirculating water could be 2 to 8 times that of the tail gas.

If desired, the recirculating line 188 and the pump 189 may be employed to recirculate water through unit 121 in a similar manner so that the weight flow of liquid through that unit per unit of time is greater than the weight flow of the tail gas, but this is not essential to achieve satisfactory removal of nitrogen dioxide in that unit.

The amount of feedwater supplied from tank 29 to conduit 45 through line 74 per unit of time is preferably about 8 to 12 percent of the weight of tail gas passing through conduit 45 and may be 20 to 60 gallons per minute, depending on the size of the plant. A major portion and preferably at least 75 percent by weight of the feedwater supplied to the trays of the absorption tower A is delivered through line 106 to said tower, and a comparable amount is supplied to line 45 from tank 29. All or substantially all of the feedwater for the absorption tower A may be obtained from the liquid being circulated through unit 141 which may contain more than 0.5 percent by weight of nitric acid. Such feedwater is preferably supplied to the absorption tower at a temperature not in excess of 10°C. and may be used to effect substantial cooling of the tower.

The water scrubber 141 will operated effectively without special means to regulate the acidity of the water. Satisfactory results can be obtained where the recirculating liquid contains as little as 0.2 to 0.3 percent by weight of nitric acid, and the amount of acid will remain greater than this so long as the tail gas contains substantial amounts of nitrogen dioxide.

The scrubbers 142 and 143 require a treating liquor containing at least about 0.2 percent by weight of nitric acid and an effective amount of urea, preferably at least 0.2 or 0.3 percent by weight. The amount of nitric acid present in the liquor may be 0.5 percent or more but is preferably not in excess of 2 percent by weight. The amount of urea may theoretically be 15 or 20 percent or more, but it is wasteful to provide more than 5 percent by weight of urea in the treating liquor. It is preferred to maintain the urea content between about 0.2 and 3 percent by weight, and to cause the ammonium nitrate content to build up to at least 10 percent by weight before or during blowdown through line 169 to the fertilizer unit 80. The ammonium nitrate is apparently formed due to the decomposition of urea to form ammonia which reacts with the nitric acid.

The makeup added through line 168 consists of about 20 to 50 percent and preferably about 25 to about 40 percent by weight of urea and the balance water. Usually there is no need to add any nitric acid to the makeup solution. A high urea concentration is desired to avoid watering down the recirculating liquor and to permit recovery of a valuable fertilizer without creating a water pollution problem.

The Masar solution used as the recirculating liquor in scrubbers 142 and 143 preferably comprises (by weight) 65 to 90 percent water, up to 5 percent urea, 10 to 25 percent ammonium nitrate, and up to 2 percent nitric acid, but the amounts may vary considerably. If desired, the consumption of urea can be minimized by maintaining the urea content between about 0.2 and 1.5 percent by weight. While best results are obtained when using urea in the Masar treating solution, it will be understood that some of the advantages of the invention are obtained when the tail gas is treated with other chemicals to remove the nitrogen oxides. For example, the urea may be partially or entirely replaced with an isomer, homologue or other urea-type compound or an amide or amine which will react with nitrogen dioxide to convert it to nitrogen gas. Compounds which may be suitable include formamide, acetamide, hydrazine, and the like.

The apparatus and process of this invention can be highly advantageous even if the treating solution used in scrubbers 142 and 143 is much less effective than the Masar treating solution described above. This is particularly true in connection with existing high-pressure ammonium nitrate plants which discharge 3000 to 4000 or more parts per million by volume of nitrogen oxides during the summer months. For example, such existing plants, when modified in accordance with this invention, could have the $NO_x$ emissions reduced 80 percent or more even if the Masar treating solution is omitted. The process would be most effective when the tail gas temperature was reduced to 2°C. or below. The apparatus of FIG. 2, for example, when operated at a suitable low temperature would be advantageous even if refrigerated water were recirculated through the scrubbers 142 and 143 instead of the urea-containing Masar solution. Such water could be ozonized, aerated or oxygenated to promote oxidation of the nitric oxide.

The unique combination employed in the apparatus of this invention, as shown in FIG. 2, for example, represents a giant step forward in the nitric acid art because it solves a very serious problem which has gone unsolved for decades. This combination makes it possible to reduce nitrogen oxide emissions from existing nitric acid plants to acceptable levels when handling tremendous volumes of gas without unduly reducing the efficiency of the plant or causing a prohibitive increase in the cost of manufacture.

A very important aspect of the invention is the provision of a process and apparatus which can effectively treat 40 to 100 tons or more of tail gas per hour with a very low pressure drop, such as 1 to 2 percent or less than 2 pounds per square inch in a plant of the type shown in FIGS. 1 and 2. When applied to existing plants discharging 3500 or more parts per million of nitrogen oxides, the apparatus and process must be extremely effective to avoid excessive consumption of expensive chemicals in the scrubbers 142 and 143.

Prior to this invention, the problem could not be solved by any known chemical scrubbing techniques because of the inability to design acceptable equipment to effect oxidation of low concentrations of nitric oxide and effective removal of nitrogen dioxide when handling the very large volumes of tail gas discharged from a nitric acid plant. For example, urea scrubbing treatments which could handle small volumes of gas in laboratory tests were quite ineffective and unacceptable for handling large volumes of tail gas, and such chemical treatments were commercially unacceptable.

If, for example, an existing nitric acid plant were modified by adding a second bubble-cap tower and recirculating a urea-containing Masar solution through the bubble-cap trays, the results obtained would be quite unsatisfactory.

The present invention solves the problem by providing a unique combination of elements and by providing unique operating conditions. The overall combination makes it possible to reduce $NO_x$ emissions from an existing ammonium nitrate plant in a simple economical manner. To achieve this, it is important to employ not only the correct equipment but also to employ a particular process wherein the tail gas is cooled to a very low temperature, preferably not substantially more than 3°C. The low temperature is particularly important in connection with the gas scrubbers 142 and 143 and is critical when attempting to reduce the nitrogen oxides content of the large volumes of tail gas to 350 to 400 parts per million by volume or less.

It is also desirable to maintain the tail gas temperature below 10°C. if equipment is provided in addition to tower D to effect further reduction in the $NO_x$ content, such as the optional unit 200 or 300. In some cases it may be desirable to add more ammonia-cooled refrigerators to maintain the tail gas temperature at 5°C. or below until it reaches the heater 24.

Where the tower D reduces the $NO_x$ content of the tail gas substantially below 0.04 percent by volume, it becomes feasible to employ a gas scrubber 300 wherein a treating solution containing an oxidizing agent or other chemical is continually recirculated through a suitable gas-liquid contact means such as bed 160 or the like. The preferred oxidizing agent is hydrogen peroxide, and a weak solution of such peroxide would preferably be circulated through the packing downwardly and in the same direction as the tail gas. Thus, the preferred flow is cocurrent rather than countercurrent. The treating solution could comprise from 0.1 to 2 percent by weight of hydrogen peroxide and the balance water. The amount of the peroxide would be minimized, however, because of its high cost. The temperature of the tail gas in the gas scrubber 300 could be maintained at 0° to 5°C. and would preferably be no more than 10°C.

The treating solution in scrubber 300 could also contain other chemicals, such as formamide, acetamide, hydrazine, urea or other suitable amide or urea-type compound. The scrubber 300 can, for example, be the same as scrubber 142 or 143 and can use substantially the same aqueous urea treating solution.

In addition to or in place of the unit 300, there can be provided a conventional ozone generator 200 and a special type of pump 201 to discharge ozone-containing air or gas to conduit 47 at a suitable pressure, such as 100 pounds per square inch. Such ozone generator can, for example, produce air or gas containing a substantial amount of ozone, such as 3 to 4 percent by volume. Although the cost of producing ozone is very high, it can become feasible when the $NO_x$ content is reduced to a very low level so that the amount of ozone consumed is not excessive.

Downstream of the unit 200 or 300, means may be provided for removing substantial amounts of nitrogen dioxide from the tail gas while the gas temperature is still below 10°C. and before the gas is reheated at unit 24. Such means may be the unit F and/or other suitable means for condensing or absorbing the nitrogen dioxide.

While the present invention has been illustrated in connection with a nitric acid plant of a type commonly used in this country wherein the oxidation of ammonia to nitric oxide in the ammonia converter C and the conversion to nitric acid by absorption are both carried out at pressures of 3 to 10 and usually at least 5 atmospheres, it will be understood that the invention applies also to large nitric acid plants of the dual-pressure type commonly used in Western Europe wherein such ammonia oxidation in the converter is at low pressure or about atmospheric pressure and the absorption in the absorption tower is carried out at pressures from about 2 to 8 atmospheres.

Thus, the invention applies to the dual-pressure nitric acid plants shown and described on pages 170–174 of the May 1956 issue of "Chemical Engineering" (Volume 63, No. 5) wherein a double fan delivers air and ammonia to an ammonia oxidizer (or converter), the ammonia is oxidized at a pressure near atmospheric pressure, the hot gasses leaving the ammonia oxidizer are cooled by being passed in seriatim through a tail gas heater, a waste heat boiler, and primary and secondary cooler-condensers, and the gases are then compressed to a pressure of 2 to 8 atmospheres or more in a large compressor driven by an expansion turbine and delivered to the absorption tower.

The tail gas from the tower passes through the aforesaid tail gas heater to pick up heat from the gases leaving the ammonia oxidizer and then passes through said expansion turbine to provide power for driving the gas compressor. It is thus seen that the operation of the absorption tower and the power recovery are basically the same as that of the nitric acid plants of the general type described in connection with FIG. 1 of the drawings.

While many features of the present invention can be applied to reduction of $NO_x$ emissions from nitric acid plants wherein the absorption towers operate at atmospheric pressure, as described in said May 1956 article in "Chemical Engineering," the cost of the equipment becomes prohibitive because of the large size required. To reduce the investment in equipment, the pressure in the absorption tower is preferably at least about 2.5 atmospheres and more preferably at least 4 or 5 atmospheres.

The desired pressure is preferably obtained by gas compressor means, such as the air compressor shown in FIG. 1 or the nitrous acid gas compressor shown and described in the above-mentioned article in connection with the dual-pressure system. Power recovery is preferably provided by transferring heat from the gases leaving the ammonia converter to the tail gas for driving a gas turbine or employing such heat to drive a steam turbine.

While the process and apparatus of this invention are particularly well suited to the improvement of existing nitric acid plants, the invention is also applicable to the design of new plants where the $NO_x$ requirements are very strict. The invention should make possible the construction of plants with a capacity of 200 to 800 tons of 100 percent nitric acid per day having $NO_x$ emissions well below 3 pounds per ton of nitric acid produced.

In the specification and claims, the nitrogen oxides content of the tail gas in percent or in parts per million refers to the amount by volume.

The term "tall gas" is applied to the gas passing from the absorption tower A, to the gas turbine 12 and to the stack.

The term "feedwater" is applied to the water from the feedwater tank 29 which is fed to the tower A directly through line 73 or indirectly through line 74, units 121 and 141, and line 106.

It will be understood that, in accordance with the provisions of the patent statutes, variations and modifications of the specific processes and devices disclosed herein may be made without departing from the spirit of the invention.

Having described our invention, we claim:

1. In a process for preparation of nitric acid by oxidation of ammonia in a gas stream to nitrogen oxides and aqueous absorption in an absorber of said nitrogen oxides to form nitric acid, said absorber being maintained under pressure by a compressor, said gas stream from said process being utilized to drive said compressor, said gas stream consisting essentially of nitrogen, oxygen, water and nitrogen oxides, the improvement comprising treating said gas stream prior to use in said compressor by:
  1. scrubbing said gas stream with cold water at a sufficiently low temperature and for a time sufficient to reduce the concentration of nitrogen oxides in said tail gas to less than 1800 parts per million by volume and to recover additional nitric acid;
  2. scrubbing said gas stream from step (1) with a treating liquor consisting essentially of water, nitric acid, urea and ammonium nitrate at a temperature and for a time sufficient to reduce the concentration of nitrogen oxides in said tail gas to less than 400 parts per million by volume, said gas stream leaving said treating liquor at a temperature no greater than 10°C., and
  3. reheating said gas stream from step (2) before its return to said compressor.

2. The improvement characterized in claim 1 wherein said cold water in step (1) is cooled to not in excess of 10°C.

3. The improvement characterized in claim 2 wherein the pressure in said absorber is at least 2 atmospheres.

4. The improvement characterized in claim 3 wherein said treating liquor in step (2) consists essentially of 65 to 95 percent by weight water, at least 5 percent by weight ammonium nitrate, 0.2 to 5 percent by weight urea and 0.1 to 2 percent by weight nitric acid.

5. The improvement characterized in claim 4 wherein said cold water in step (1) and said treating liquor in step (2) are separately recirculated, portions of said treating liquor are separated to recover ammonium nitrate and are replaced with makeup liquid comprising a major amount by weight of water and sufficient urea to maintain an effective urea level in said treating liquor.

6. The improvement characterized in claim 5 wherein said treating liquor in step (2) contains at least 10 percent by weight ammonium nitrate.

7. The improvement characterized in claim 6 wherein step (1) is divided into two steps:
  1a. cooling said gas stream to a sufficiently low temperature to reduce the concentration of nitrogen oxides in said gas stream to less than 2000 parts per million by volume and to recover additional nitric acid; and
  1b. scrubbing said gas stream from step (1a) with cold water at a sufficiently low temperature and for a time sufficient to reduce the concentration of nitrogen oxides in said gas stream to less than 1200 parts per million by volume and to recover additional nitric acid.

8. The improvement characterized in claim 7 wherein said cooling step (1a) is accomplished by heat exchange with liquid ammonia.

9. The improvement characterized in claim 8 wherein said treating liquor in step (2) is cooled to not in excess of 2°C.

10. The improvement characterized in claim 9 wherein said gas stream from step (1) is cooled to less than 7°C.

11. The improvement characterized in claim 6 wherein said makeup liquid contains at least 20 percent by weight of urea.

12. The improvement characterized in claim 11 wherein said tail gas from step (3) is scrubbed with a separate treating liquor containing an oxidizing agent.

13. The improvement characterized in claim 12 wherein said separate treating liquor comprises water and an oxidizing agent selected from the group consisting of hydrogen peroxide and potassium permanganate.

14. The improvement characterized in claim 11 wherein ozone is introduced into said tail gas from step (3) to promote oxidation of the remaining nitric oxide and substantial amounts of nitrogen dioxide are removed before the tail gas temperature is raised above 15°C.

15. In a process for preparation of nitric acid by oxidation of ammonia in a gas stream to nitrogen oxides and aqueous absorption in an absorber of said nitrogen oxides to form nitric acid, said absorber being maintained under pressure by a compressor, the gas stream being scrubbed with water while under pressure and thereafter being reheated and utilized in an expander to drive said compressor, the improvement which comprises:
1. chilling said gas stream by heat exchange with a refrigerant to condense nitrogen oxides and vaporize the refrigerant,
2. causing the refrigerated gas stream to be scrubbed with cold water at a temperature not in excess of 10°C. sufficiently low to reduce the concentration of nitrogen oxides to less than 1200 parts per million by volume while substantially increasing the recovery of nitric acid,
3. scrubbing the refrigerated gas stream from step (2) with a treating liquor consisting essentially of water, nitric acid, urea and ammonium nitrate at a temperature and for a time sufficient to reduce the concentration of nitrogen oxides to less than 400 parts per million by volume, the temperature of said refrigerated gas stream during treatment being no greater than 10°C.,
4. recirculating said treating liquor to build up the concentration of ammonium nitrate and removing portions of said liquor to recover such ammonium nitrate,
5. replacing the removed liquor with a makeup liquid comprising water and sufficient urea to maintain an effective urea level in said treating liquor, and
5. reheating said tail gas from step (3) before its return to said expander.

16. The improvement characterized in claim 15 wherein the refrigerated gas stream is scrubbed at a temperature less than 7°C.

17. The improvement characterized in claim 15 wherein the gas stream is refrigerated in step (1) by heat exchange with liquid ammonia to a sufficiently low temperature to reduce the concentration of nitrogen oxides from more than 2500 to no more than 1800 parts per million.

18. The improvement characterized in claim 17 wherein said low temperature is not in excess of about 5°C.

19. In a process for preparation of nitric acid by oxidation of ammonia in a gas stream to nitrogen oxides and aqueous absorption in an absorber of said nitrogen oxides to form nitric acid, said absorber being maintained under pressure by a compressor, the gas stream being scrubbed with water while under pressure and thereafter being reheated and utilized in an expander to drive said compressor, the improvement which comprises:
1. refrigerating the gas stream from said absorber to a sufficiently low temperature to reduce the concentration of nitrogen oxides to less than 2000 parts per million by volume,
2. scrubbing the refrigerated gas stream from step (1) with cold water at a temperature not in excess of 10°C. sufficiently low to reduce the concentration of nitrogen oxides therein to less than 1200 parts per million by volume while substantially increasing the recovery of nitric acid,
3. scrubbing the refrigerated gas stream from step (2) with a treating liquor consisting essentially of water, nitric acid, urea and ammonium nitrate at a temperature and for a time sufficient to reduce the concentration of nitrogen oxides to less than 400 parts per million by volume, the temperature of said refrigerated gas stream during treatment being no greater than 10°C.,
4. reheating said tail gas from step (3) before its return to said expander, and
5. removing portions of said treating liquor to recover ammonium nitrate while replacing the removed liquor with a makeup liquid comprising water and sufficient urea to maintain an effective urea level in said treating liquor.

20. The improvement characterized in claim 19 wherein the gas is scrubbed at a temperature less than 7°C. in step (2).

21. The improvement characterized in claim 19 wherein said gas stream is refrigerated by heat exchange with liquid ammonia.

22. The improvement characterized in claim 19 wherein steps (1) through (5) are applied to an existing nitric acid plant having an absorption tower which discharges a gas stream containing at least 2500 parts per million by volume of nitrogen oxides and said steps reduce the nitrogen oxides content to no more than 400 parts per million by volume.

23. The improvement characterized in claim 22 wherein the cold water used to effect scrubbing in step (2) is recirculated to build up the concentration of nitric acid and is continually fed to the absorption tower of said existing plant at a temperature less than 10°C.

24. In a process for preparation of nitric acid by oxidation of ammonia in a gas stream to nitrogen oxides and aqueous absorption in an absorber of said nitrogen oxides to form nitric acid, said absorber being maintained under pressure by a compressor, the gas stream being scrubbed with water while under pressure and thereafter being reheated and utilized in an expander to drive said compressor, the improvement which comprises:
1. refrigerating the gas stream from said absorber by heat exchange with liquid ammonia to a temperature not in excess of 10°C.,
2. scrubbing the refrigerated gas stream from step (1) with cold water at a temperature not in excess of 10°C. to effect material reduction in the nitrogen oxides content while recovering substantial increased amounts of nitric acid, and
3. scrubbing the refrigerated gas stream from step (2) with a treating liquor consisting essentially of water, nitric acid, urea and ammonium nitrate to effect further material reduction in the nitrogen oxides content before the gas stream is reheated and passed to said expander, the gas stream having a temperature no greater than 10°C. when it leaves the treating liquor.

25. The improvement characterized in claim 24 wherein the gas stream is chilled to a temperature not in excess of 5°C. in step (1) and is scrubbed at a temperature less than 7°C. in step (2).

26. The improvement characterized in claim 15 wherein refrigeration of the gas stream is effected by scrubbing the stream with water cooled to a temperature less than 7°C. by heat exchange with liquid ammonia.

* * * * *